C. KLEEMAN.
TRANSPLANTING POT.
APPLICATION FILED MAR. 7, 1910.
980,873.
Patented Jan. 3, 1911.
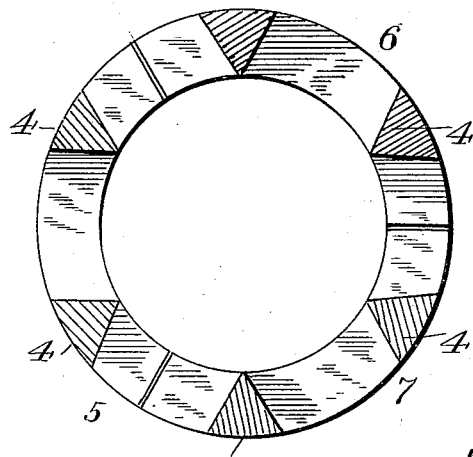
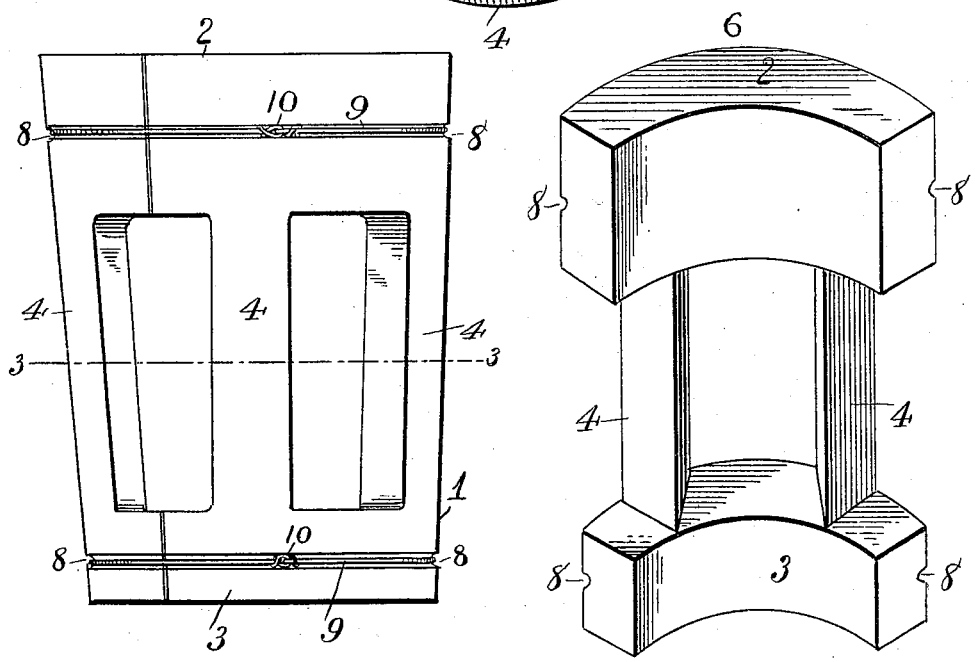
Witnesses
J. L. Ourand.
W. Parker Reinohl
Inventor
C. Kleeman.
by D. C. Reinohl
Attorney
THE NORRIS PETERS CO., WASHINGTON, D. C.

UNITED STATES PATENT OFFICE.

CHARLEY KLEEMAN, OF ROSWELL, TERRITORY OF NEW MEXICO.

TRANSPLANTING-POT.

980,873.          Specification of Letters Patent.      Patented Jan. 3, 1911.

Application filed March 7, 1910. Serial No. 548,025.

*To all whom it may concern:*

Be it known that I, CHARLEY KLEEMAN, a citizen of the United States, residing at Roswell, in the county of Chaves and Territory of New Mexico, have invented certain new and useful Improvements in Transplanting-Pots; and I do hereby declare the following to be a full, clear, and exact description of the invention, such as will enable others skilled in the art to which it appertains to make and use the same.

The invention relates to transplanting-pots, for seeds, plants, shrubs, trees and the like, and has for its object a device in which the growth of plants and the like may be started and subsequently reset or transplanted without disturbing their roots; and the invention consists in certain improvements in construction which will be fully disclosed in the following specification and claim.

In the accompanying drawings, which form part of this specification: Figure 1 represents a side elevation of my improved transplanting-pot. Fig. 2 is a detail perspective of one of the segmental members on an enlarged scale, and Fig. 3 is a horizontal section on line 3—3, Fig. 1.

Reference being had to the drawings and the designating characters thereon, 1 indicates an assembled pot ready for use, and comprises a circumferential band 2 at the top of the pot, a like band 3 at the bottom and intervening bars 4. The pot is preferably slightly tapered toward its lower end and is open and unobstructed at both ends, and forms a skeleton body. The bars 4 may be tapered inward toward the center of the pot, to form inclined walls on their edges to hold the soil and prevent it spilling through the spaces between the bars in handling or by the expansion or growth of the roots of the plants.

The pot is made in a plurality of sections or segmental members, 5, 6, 7, each provided with segmental bands 2 and 3 and bars 4, and in the outer surface of the bands 2 and 3 is a groove 8 to receive a hoop 9, for securing the segments in position. The hoop may be a piece or strand of wire detachably secured together at its ends, as by a hook and an eye or loop, 10, or in any preferred manner, so that for transplanting purposes the pot may be readily separated and removed and the plant reset or transplanted without disturbing the roots.

The pots are generally set in a bed or the like and the interior thereof filled with soil and the soil filled in the spaces around and between the pots to afford ample space for the growth of the roots of the plants, which are placed in the pots.

The pots are preferably made of pottery ware, which is not subject to corrosion or swelling due to the moisture of the soil, can be produced at very small cost, and may be made in various sizes to suit the purpose of their use.

Having thus fully described my invention, what I claim is:—

A transplanting-pot composed of a plurality of separate segmental members having bands at their upper and lower ends, bars integral with, connecting said bands and having inwardly inclined edges, and forming a bottomless pot with a skeleton body, and means applied around said bands for securing the members together.

CHARLEY KLEEMAN.

Witnesses:
   E. C. WHITE,
   G. E. EMINGER,
   JAS. HAMILTON.